US008995057B2

(12) United States Patent
Miyasaka et al.

(10) Patent No.: US 8,995,057 B2
(45) Date of Patent: Mar. 31, 2015

(54) DIFFRACTIVE OPTICAL ELEMENT AND MEASUREMENT INSTRUMENT

(75) Inventors: Koji Miyasaka, Fukushima (JP); Takuji Nomura, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 249 days.

(21) Appl. No.: 13/285,204

(22) Filed: Oct. 31, 2011

(65) Prior Publication Data

US 2012/0105855 A1    May 3, 2012

(30) Foreign Application Priority Data

Nov. 2, 2010 (JP) .................................. 2010-246518

(51) Int. Cl.
*G01B 11/25* (2006.01)
*G02B 27/42* (2006.01)

(52) U.S. Cl.
CPC ............ *G01B 11/2513* (2013.01); *G01B 11/25* (2013.01); *G02B 27/4233* (2013.01)
USPC ....................................................... 359/566

(58) Field of Classification Search
CPC .......................................... G02B 5/18–5/1895
USPC ........................................ 359/1–35, 558–576
See application file for complete search history.

(56) References Cited

U.S. PATENT DOCUMENTS

| | | | |
|---|---|---|---|
| 5,412,631 A * | 5/1995 | Komma et al. ............ 369/44.37 |
| 6,101,269 A | 8/2000 | Hunter et al. |
| 6,930,775 B1 * | 8/2005 | Spremo et al. ................ 356/328 |
| 2005/0254751 A1 * | 11/2005 | Ushiro et al. .................... 385/37 |
| 2006/0033995 A1 * | 2/2006 | Smith et al. .................... 359/568 |
| 2009/0096783 A1 | 4/2009 | Shpunt |
| 2009/0185274 A1 | 7/2009 | Shpunt |

(Continued)

FOREIGN PATENT DOCUMENTS

| | | |
|---|---|---|
| JP | 2002-122417 | 4/2002 |
| JP | 2002-196654 | 7/2002 |

(Continued)

OTHER PUBLICATIONS

U.S. Appl. No. 13/206,100, filed Aug. 9, 2011, Koji Miyasaka, et al.

(Continued)

*Primary Examiner* — Suchin Parihar
*Assistant Examiner* — Jeffrey Madonna
(74) *Attorney, Agent, or Firm* — Oblon, McClelland, Maier & Neustadt, L.L.P.

(57) ABSTRACT

A diffractive optical element includes: a first diffractive element in which a plurality of basic units are two-dimensionally arranged; and a second diffractive element in which a plurality of basic units are two-dimensionally arranged, wherein when a direction in which the basic units are arranged in the first diffractive element is a first direction, a direction in which the basic units are arranged in the second diffractive element is a second direction, an angle $\phi$ between the first direction and the second direction is such that $-|\phi_1|<\phi<|\phi_1|$, and $\phi \neq 0$, $\sin \phi_1 = -\alpha/\Delta x$ where a closest distance of zero-order light generated when the diffracted light generated by the first diffractive element is further incident on the second diffractive element is $\Delta x$ and a closest distance of the diffracted light and stray light generated by the second diffractive element is $\alpha$.

20 Claims, 15 Drawing Sheets

(56) References Cited

U.S. PATENT DOCUMENTS

2010/0141959 A1* 6/2010 Kuchel ............... 356/521
2013/0093936 A1* 4/2013 Scheeline et al. ......... 348/345

FOREIGN PATENT DOCUMENTS

| JP | 2009-531655 | 9/2009 |
| WO | WO02/03384 | 1/2002 |
| WO | WO 2007/105205 A2 | 9/2007 |
| WO | WO 2009/093228 A2 | 7/2009 |

OTHER PUBLICATIONS

U.S. Appl. No. 13/1760,831, filed Feb. 6, 2013, Miyasaka, et al.
U.S. Appl. No. 13/407,108, filed Feb. 28, 2012, Miyasaka.

* cited by examiner

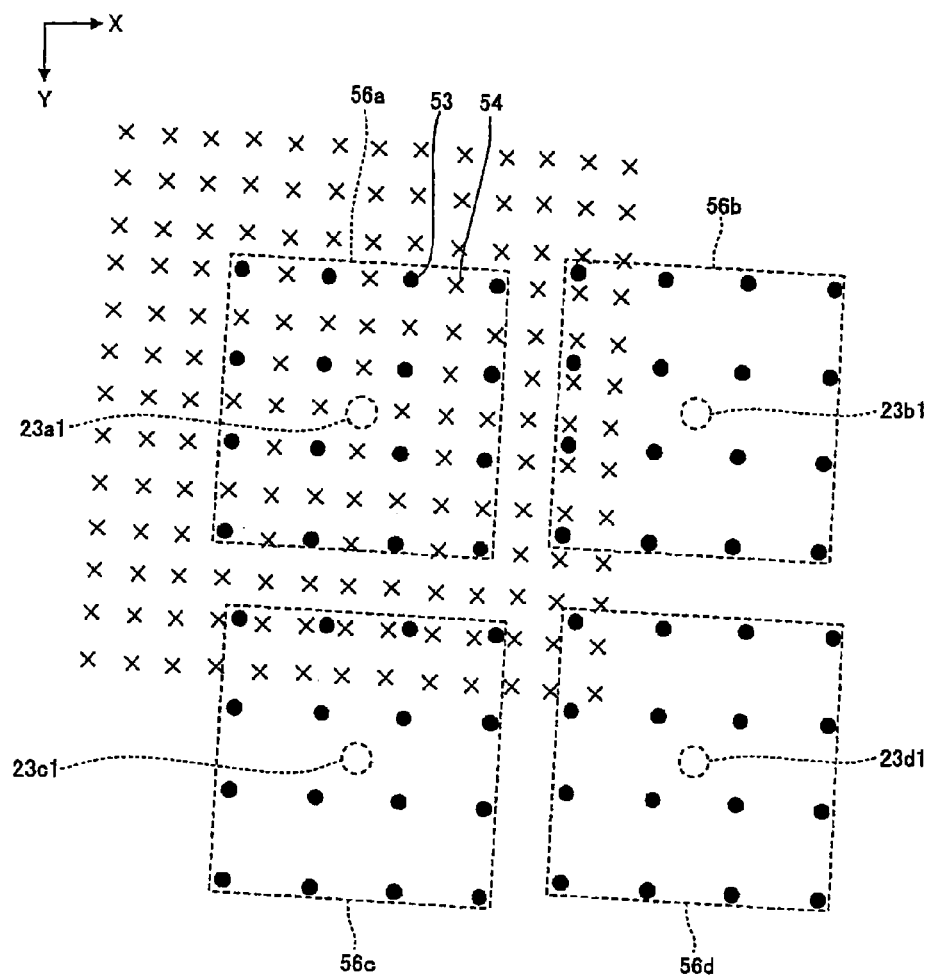

●: DIFFRACTED LIGHT
×: STRAY LIGHT

DIFFRACTIVE OPTICAL ELEMENT AND MEASUREMENT INSTRUMENT

BACKGROUND

1. Field of the Invention

The present invention relates to a diffractive optical element and a measurement device using the diffractive optical element.

2. Description of the Related Art

A diffractive optical element that diffracts at least a part of incident light is used in various optical devices, optical apparatuses and the like. As an optical device, for example, an optical three-dimensional measurement device is available that performs three-dimensional measurement by radiating a predetermined light projection pattern to an object to be measured and obtaining an image of the object to be measured to which the predetermined light projection pattern is radiated. In such a three-dimensional measurement device, the diffractive optical element is used for generating the predetermined projection pattern of light.

U.S. Pat. No. 6,101,269 discloses a method in which when three-dimensional measurement is performed, a speckle pattern generated by a diffractive optical element is radiated as the projection pattern of light radiated to the object to be measured. WO2009/093228 discloses a method in which a plurality of diffractive optical elements are used to improve the controllability of the light quantity distribution of the diffracted light.

However, in U.S. Pat. No. 6,101,269, in the speckle pattern, since light spots of high intensity are formed in random positions within the projection surface, roughness occurs in the in-surface distribution of the light spots on the projection surface. For this reason, in a region where no light spot in the speckle pattern is radiated, three-dimensional information cannot be obtained, so that precise three-dimensional measurement cannot be performed. Consequently, the resolution of the three-dimensional measurement device decreases.

When a plurality of diffractive optical elements are used as in WO2009/093228, it is necessary to consider the stray light generated by the diffractive optical elements. That is, when light spots of the diffracted light and light spots of the stray light coincide with each other, the light intensity becomes unstable because of interference of light, so that there are cases where the light intensity enormously decreases. When the light intensity at light spots decreases like this, roughness occurs in the in-surface distribution of the light spots on the projection surface, so that it is impossible to precisely perform three-dimensional measurement and the like.

SUMMARY

The present invention is made in view of the above-described regards, and an object thereof is to provide a diffractive optical element where the light intensity of the light spots of the diffracted light is stable and a plurality of light spots having a predetermined light intensity can be easily obtained, and provide a measurement device capable of performing precise measurement.

According to a first aspect of the invention, there is provided a diffractive optical element, configured to generate two-dimensional diffracted light for incident light, including: a first diffractive element in which a plurality of basic units are two-dimensionally arranged; and a second diffractive element in which a plurality of basic units are two-dimensionally arranged, wherein when a direction in which the basic units are arranged in the first diffractive element is a first direction, a direction in which the basic units are arranged in the second diffractive element is a second direction and the light is incident in order of the first diffractive element and the second diffractive element, an angle $\phi$ between the first direction and the second direction is such that $-|\phi_1|<\phi<|\phi_1|$, and $\phi \neq 0$, $\sin \phi_1 = -\alpha/\Delta x$ where a closest distance of zero-order light generated when the diffracted light generated by the first diffractive element is further incident on the second diffractive element is $\Delta x$ and a closest distance of the diffracted light and stray light generated by the second diffractive element is $\alpha$.

In the first aspect of the invention, a pitch of the basic units formed in the first diffractive element and a pitch of the basic units formed in the second diffractive element may be both different values in a two-dimensional direction.

According to a second aspect of the invention, there is provided a diffractive optical element, configured to generate two-dimensional diffracted light, including a plurality of diffractive elements in which a plurality of basic units are two-dimensionally arranged, wherein the two-dimensional diffracted light is generated by making light incident on the plurality of diffractive elements; and when a distance between a center of a light spot of the diffractive light and a center of a light spot of stray light generated by the plurality of diffractive elements is d and a radius of the light spots is r, d>r.

According to a third aspect of the invention, there is provided a diffractive optical element, configured to generate two-dimensional diffracted light for incident light, including: a first diffractive element in which a plurality of basic units are two-dimensionally arranged; and a second diffractive element in which a plurality of basic units are two-dimensionally arranged, wherein when a distance between a center of a light spot of the diffractive light and a center of a light spot of stray light generated by the first diffractive element and the second diffractive element is d and a radius of the light spots is r, d>r.

In the third aspect of the invention, a pitch of the basic units formed in the first diffractive element and a pitch of the basic units formed in the second diffractive element may be both different values in a two-dimensional direction.

In the second or third aspect, d may be larger than 2r.

According to a fourth aspect of the invention, there is provided measurement device including: a light source that emits light; the diffractive optical on which the light is incident and from which diffracted light exits; and an imaging element that takes an image of an object to be measured to which the diffracted light is radiated.

According to the present invention, a diffractive optical element can be provided where the light intensity of the light spots of the diffracted light is stable and a plurality of light spots having a predetermined light intensity can be easily obtained. Moreover, a measurement device can be provided that is capable of performing precise measurement.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 5A, 5B and 5C are explanatory views of light spots generated by the diffractive optical element according to the present embodiment;

DETAILED DESCRIPTION OF THE INVENTION

Figure 1:
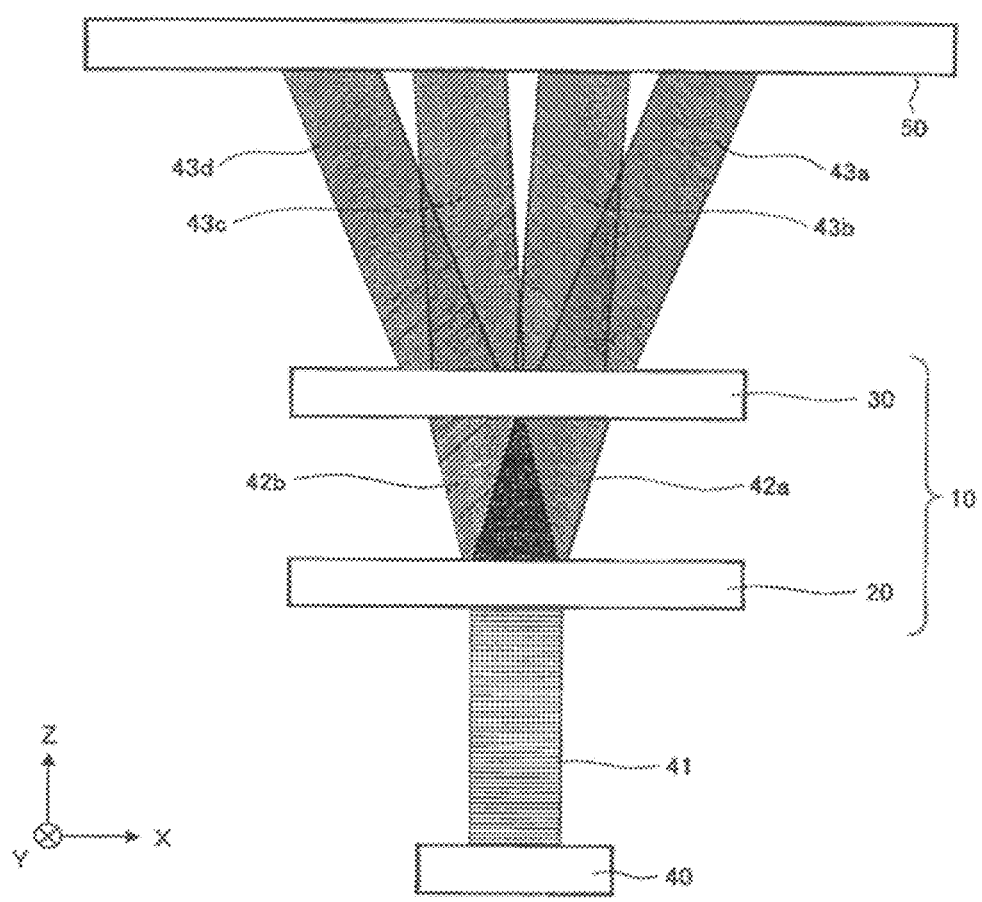
FIG. 1 is an explanatory view (1) of a diffractive optical element according to the present embodiment.

A mode for carrying out the invention will be described below. Like members and the like are denoted by like reference numerals, and descriptions thereof are omitted.

(Diffractive Optical Element)

A diffractive optical element according to the present embodiment will be described based on FIGS. 1, 2A and 2B. The diffractive optical element 10 according to the present embodiment has a first diffractive element 20 and a second diffractive element 30. The first diffractive element 20 and the second diffractive element 30 are set or fixed in a condition of being aligned in predetermined positions. The first diffractive element 20 and the second diffractive element 30 each serve as a diffractive optical element by itself. While the first diffractive element 20 and the second diffractive element 30 each have convex and concave on one surface of a single transparent substrate and these are placed one on another in the diffractive optical element 10, the present invention is not limited thereto.

In addition thereto, a structure may be adopted in which the diffractive optical element 10 is formed of a single transparent substrate and convex and concave are provided on both surfaces of this transparent substrate. In this case, the convex and concave on one surface of the transparent substrate are considered as the first diffractive element 20, and the convex and concave on the other surface, as the second diffractive element 30.

While the diffracted lights outgoing from the first diffractive element 20 and the second diffractive element 30 each have a distribution, it is preferable that the distributions of these diffracted lights be different from each other. That the distributions are different from each other referred to here means, specifically, that when light is made incident on the first diffractive element 20 and on the second diffractive element 30 under the same condition, the distributions of the diffracted lights projected onto the same projection surface are different from each other. The distributions of the diffracted lights may be such that the diffracted lights are regularly arranged with respect to the projection surface or may be such that they are arranged in a random manner. While light is incident in the order of the first diffractive element 20 and the second diffractive element 30 unless otherwise specified, in the present embodiment, the same effects are produced even when light is incident in the order of the second diffractive element 30 and the first diffractive element 20.

FIG. 1 is a schematic view showing a manner in which light is incident on the diffractive optical element 10 according to the present embodiment, and shows a manner in which the light emitted from a light source 40 is diffracted by the diffractive optical element 10 and projected onto a projection surface 50. In FIG. 1, the diffractive optical element 10 according to the present embodiment is set so that the plane surface of the first diffractive element 20 and the plane surface of the second diffractive element 30 included in the diffractive optical element 10 are substantially parallel to an X-Y plane, and light 41 emitted from the light source 40 is radiated thereto to thereby generate diffracted light. The light 41 emitted from the light source 40 is first incident on the first diffractive element 20 and generates diffracted lights 42a and 42b. The generated diffracted lights 42a and 42b are further incident on the second diffractive element 30, so that diffracted lights 43a and 43b are generated from the diffracted light 42a and diffracted lights 43c and 43d are generated from the diffracted light 42b. Consequently, light spots whose number which is the product of the number of light spots of the diffracted lights generated by the first diffractive element 20 and the number of light spots of the diffracted lights generated by the second diffractive element 30 are radiated to the projection surface 50. The optical axis of the light 41 emitted from the light source 40 is a Z-axis direction.

Figure 2A:
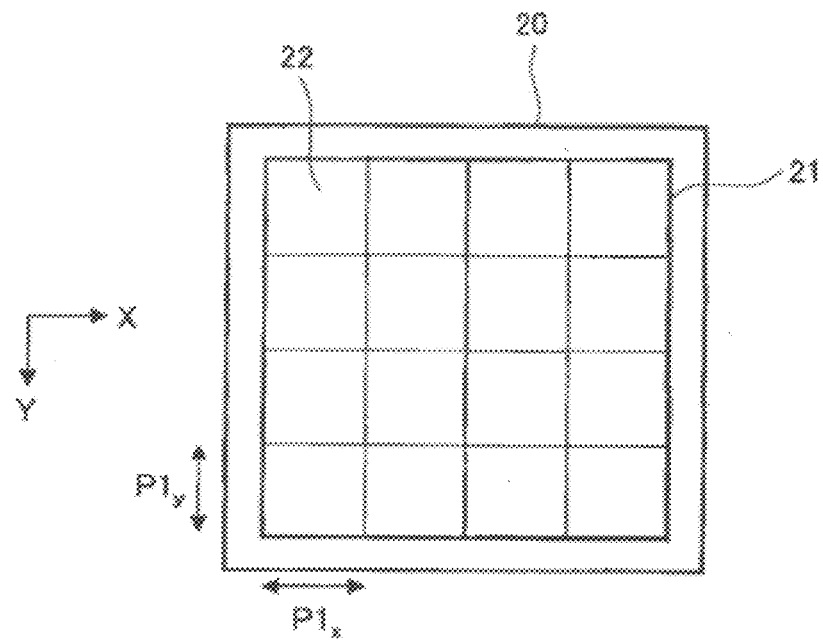
FIGS. 2A and 2B are structural views of a first diffractive element and a second diffractive element.
Figure 2B:
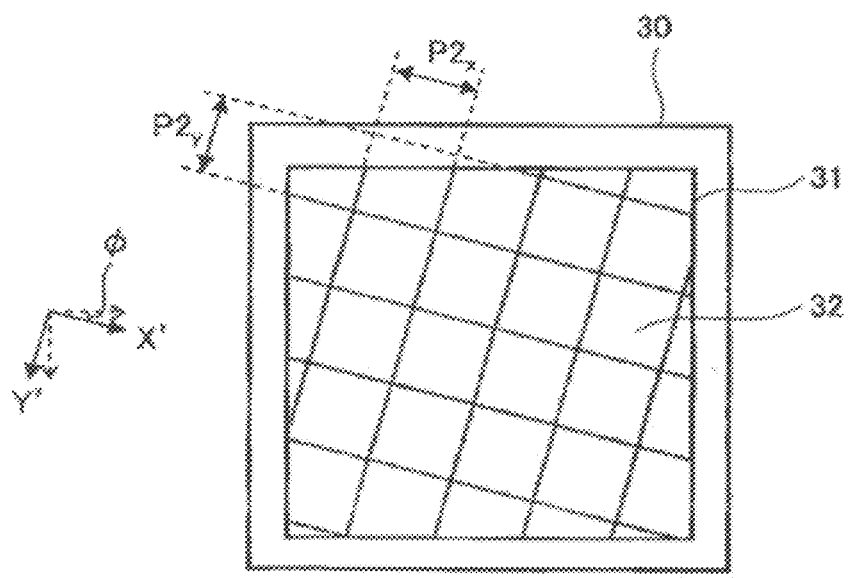

FIGS. 2A and 2B are views showing the plane surfaces of the first diffractive element 20 and the second diffractive element 30, that is, the surfaces orthogonal to the optical axis, respectively. In the first diffractive element 20, at least the region where light is incident is formed of a plate-like material that transmits light, and a diffraction region 21 that diffracts light being incident (hereinafter, referred to as "incident light") is provided. The diffraction region 21 is formed by two-dimensionally arranging a plurality of basic units 22 in an X-axis direction and in a Y-axis direction. The basic units 22 each have a pitch $P1_x$ in the X-axis direction and a pitch $P1_y$ in the Y-axis direction, and are periodically arranged. While the shape of the outer edge of the diffraction region 21 is square in FIG. 2A, the shape of the outer edge of the diffraction region 21 may be polygonal, circular, elliptic or the like as long as the two-dimensional arrangement of the basic units 22 is made so as to include all the effective region corresponding to the region of the light, to be used as diffracted light, of the incident light.

Moreover, the basic units 22 generate a predetermined phase distribution for the outgoing light (hereinafter, referred to as "exit light"), and by periodically arranging these basic units 22, the first diffractive element 20 generates a diffraction action shown by Expression 1. While in FIG. 1, the light 41 emitted from the light source 40 is incident from the Z-axis direction orthogonal to the X-Y plane which is the plane surface of the first diffractive element 20, the present invention is not limited thereto. It may be made incident from a direction slanting with respect to the Z-axis direction. In this case, by giving an incident angle $\theta 1_{xi}$ within a Z-X plane and an incident angle $\theta 1_{yi}$ within a Z-Y plane of the incident light to Expression 1, exit angles $\theta 1_{xo}$ and $\theta 1_{yo}$ within the planes can be obtained.

$$\sin \theta 1_{xo} = \sin \theta 1_{xi} + n1_x \lambda / P1_x$$

$$\sin \theta 1_{yo} = \sin \theta 1_{yi} + n1_y \lambda / P1_y \qquad \text{[Expression 1]}$$

($\theta 1_{xo}$ and $\theta 1_{yo}$ are the exit angles within the Z-X plane and the Z-Y plane of the exit light, $\theta 1_{xi}$ and $\theta 1_{yi}$ are the incident angles within the Z-X plane and the Z-Y plane of the incident light, $n1_x$ and $n1_y$ are the diffraction orders, and $\lambda$ is the wavelength of the incident light.)

Moreover, in the second diffractive element 30, at least the region where light is incident is similarly formed of a plate-like material that transmits light, and a diffraction region 31 that diffracts incident light is provided. The diffraction region 31 is formed by two-dimensionally arranging a plurality of basic units 32 in an X'-axis direction and in a Y'-axis direction. The basic units 32 each have a pitch $P2_x$ in the X'-axis direction and a pitch $P2_y$ in the Y'-axis direction, and are periodically arranged. The X'-axis direction and the Y'-axis direction coincide with directions rotated by an angle φ (φ≠0) from the X-axis direction and the Y-axis direction on the X-Y plane, respectively. That is, the angle between the direction of the pitch $P1_x$ (arrangement direction) in which the basic units 22 are arranged in the first diffractive element 20 and the direction of the pitch $P2_x$ (arrangement direction) in which the basic units 32 are arranged in the second diffractive element 30 is the angle φ. Moreover, as in the case of the diffraction region 21, the shape of the outer edge of the diffraction region 31 may be polygonal, circular, elliptic or the like as long as the two-dimensional arrangement of the basic units 32 is made so as to include all the effective region of the incident light.

Moreover, the basic units 32 generate a predetermined phase distribution for the exit light, and by periodically arranging these basic units 32, the second diffractive element 30 generates a diffraction action shown by Expression 2. In FIG. 1, light is incident from a direction slanting with respect to the Z-axis direction orthogonal to the X'-Y' plane which is the plane surface of the second diffractive element 30. In this case, by giving an incident angle $\theta 2_{x'i}$ within a Z-X' plane and an incident angle $\theta 2_{y'i}$ within a Z-Y' plane of the incident light to Expression 2, exit angles $\theta 2_{x'o}$ and $\theta 2_{y'o}$ within the planes can be obtained.

$$\sin \theta 2_{x'o} = \sin \theta 2_{x'i} + n2_x \lambda / P2_x$$

$$\sin \theta 2_{y'o} = \sin \theta 2_{y'i} + n2_y \lambda / P2_y \quad \text{[Expression 2]}$$

($\theta 2_{x'o}$ and $\theta 2_{y'o}$ are the exit angles within the Z-X' plane and the Z-Y' plane of the exit light, $\theta 2_{x'i}$ and $\theta 2_{y'i}$ are the incident angles within the Z-X' plane and the Z-Y' plane of the incident light, $n2_x$ and $n2_y$ are the diffraction orders, and $\lambda$ is the wavelength of the incident light.)

Figure 3:
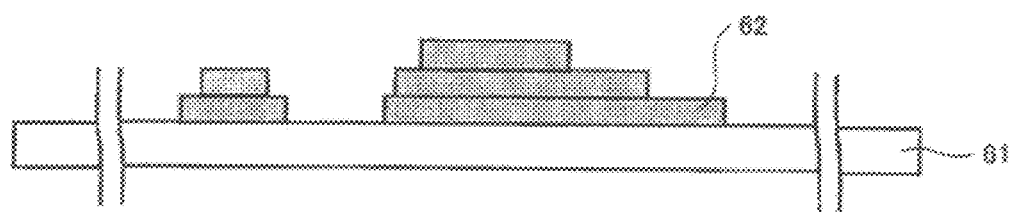
FIG. 3 is a cross-sectional view of the first diffractive element and the second diffractive element.

FIG. 3 is a view schematically showing the cross-sectional structure of the first diffractive element 20 and the second diffractive element 30. The first diffractive element 20 and the second diffractive element 30 both have a substrate 61 that transmits light. In the diffraction region 21 and the diffraction region 31 on the surface of the substrate 61, a convex and concave pattern 62 is provided. For the convex and concave pattern 62, the same material as that of the substrate 61 may be used or a different material may be used. For the convex and concave pattern 62, for example, an inorganic material, an organic material, a sol-gel film, an organic-inorganic hybrid material or the like may be used. As shown in FIG. 3, the first diffractive element 20 and the second diffractive element 30 may have a structure in which the surface of the convex and concave pattern 62 is exposed, that is, the medium on the side of the convex and concave pattern 62 may be air. In addition thereto, a structure may be adopted in which by combining materials having different refractive indices, that is, by providing another transparent material having a different refractive index so as to fill the convex and concave pattern 62, the convex and concave pattern is obtained by the interface between these two materials.

Next, the basic units 22 in the first diffractive element 20 and the basic units 32 in the second diffractive element 30 will be described. Generally, the diffracted light distribution in a diffractive optical element can be obtained by Fourier-transforming the phase distribution of the exit light from the diffractive optical element. In particular, when the phase distribution of the diffractive optical element has periodicity, by Fourier-transforming the phase distributions at the basic units 22 and the basic units 32 which are the basis of the periodicity, information on the orders of the diffracted light generated for the incident light can be obtained. The phase distributions of the basic units 22 and the basic units 32 are obtained, for example, by using iterative Fourier transformation method or the like, and the basic units 22 and the basic units 32 can be concretely produced based on the phase distributions.

Here, when the intensity of the light obtained as a result of the Fourier transformation is sufficiently high at certain orders ($n_{XS}$, $n_{YS}$), diffracted light of these orders ($n_{XS}$, $n_{YS}$) is generated, and the diffraction direction (diffraction angle) of this diffracted light is given in Expression 1. With respect to the orders ($n_{XS}$, $n_{YS}$), $n_{XS}$ is the order of the diffracted light diffracted in the X-axis direction, and $n_{YS}$ is the order of the diffracted light diffracted in the Y-axis direction. Since light having such orders and diffraction angle is diffracted light that can be intentionally generated when the diffractive optical element is designed, such diffracted light is sometimes called merely diffracted light or design diffracted light.

When the intensity obtained as a result of the Fourier transformation is substantially zero at certain orders ($n_{XS}$, $n_{YS}$), diffracted light of these orders ($n_{XS}$, $n_{YS}$) is not generated. However, for actual diffractive optical elements, there are cases where diffractive optical elements are produced in a configuration slightly shifted from a predetermined ideal configuration because of an influence of a manufacturing error or the like, and at this time, there are cases where slight diffracted light is generated at the orders ($n_{XS}$, $n_{YS}$) where no diffractive light should be generated intrinsically. Such slight diffracted light at the orders ($n_{XS}$, $n_{YS}$) where no diffractive light should be generated intrinsically in design is called stray light. The direction in which stray light is generated is given in Expression 1 as in the case of the diffracted light.

Figure 4A:
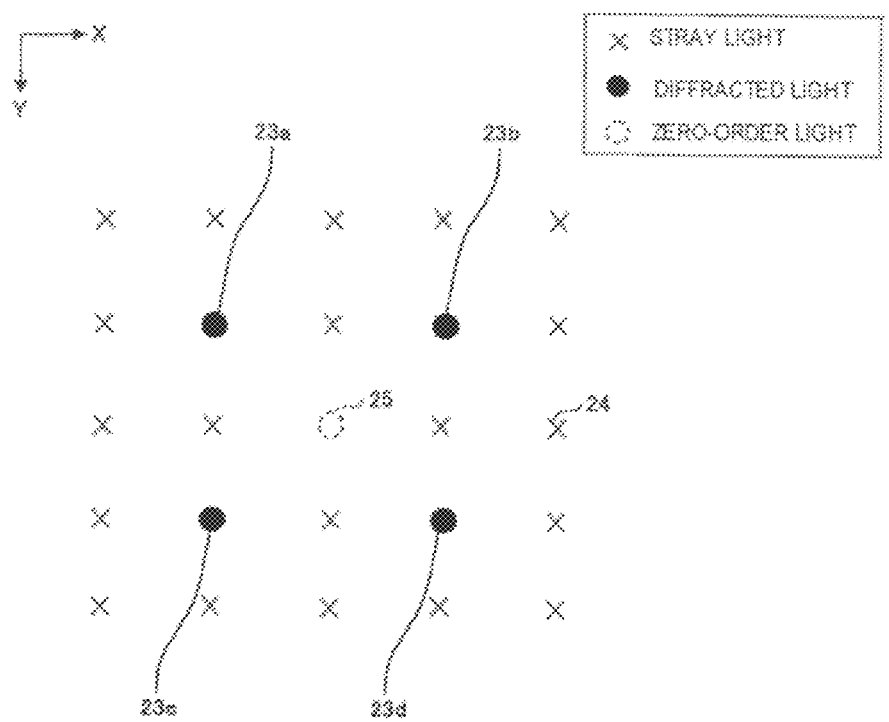
FIGS. 4A and 4B are explanatory views of the first diffractive element and the second diffractive element.
Figure 4B:
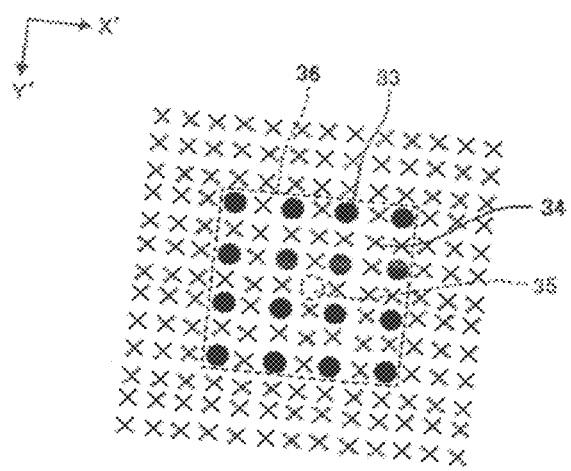

FIGS. 4A and 4B are views schematically showing light spots of the diffracted light, the stray light and the zero-order light generated at the first diffractive element 20 and the second diffractive element 30, respectively, and show a plane vertical to the optical axis of the light incident on the diffractive optical element 10. The zero-order light corresponds to the rectilinear transmission direction of the incident light, and in FIGS. 4A and 4B showing the projection patterns of the diffracted light and the stray light, the diffraction angles are of a degree where the pattern is not distorted, and this condition also applies to other projection patterns unless otherwise specified. First, FIG. 4A is a view showing an example of light spots of the diffracted light, the stray light and the zero-order light generated by the first diffractive element 20. At the first diffractive element 20, four light spots 23a, 23b, 23c and 23d by the diffracted light are generated. Optical spots 24 of the stray light is generated between the light spots 23a, 23b, 23c and 23d of the diffracted light and on straight extension lines connecting two of the light spots 23a, 23b, 23c and 23d of the diffracted light. Moreover, when light is incident from a direction substantially vertical to the plane surface of the diffractive optical element 10 like this, a light spot 25 of the zero-order light is generated at the point of intersection between the straight line connecting the light spot 23a and the light spot 23d and the straight line connecting the light spot 23b and the light spot 23c.

In the first diffractive element 20, for the light spots 23a, 23b, 23c and 23d of the diffracted light, with one light spot as the reference, a straight line connecting the light spot and the light spot that is the closest of the other light spots is substantially parallel to the X-axis direction or the Y-axis direction. When with one light spot as the reference, the number of light spots that are the closest of the other light spots is two, if a straight line connecting the light spot as the reference and one of the two light spots is substantially parallel to the X-axis direction, a straight line connecting the light spot as the reference and the other of the two light spots is substantially parallel to the Y-axis direction. Further, the stray light 24 is generated so as to be present in a plural number on the straight line substantially parallel to the X-axis direction and on the straight line substantially parallel to the Y-axis direction.

FIG. 4B is a view showing light spots of the diffracted light, the stray light and the zero-order light generated by the second diffractive element 30. At the second diffractive element 30, light spots 33 by sixteen diffracted lights represented as black circles in FIG. 4B are generated, and a diffracted light radiation region 36 is provided by the light spots 33 by these diffracted lights. The diffracted light radiation region 36 corresponds to a region formed by surrounding all the light spots 33 so that the area is smallest. When the light spots 33 are two-dimensionally arranged with regularity like this, the diffracted light radiation region 36 is a square region. Moreover, when one of the light spots 33 by the diffracted lights is the reference, a plurality of light spots 33 are generated on a straight line substantially parallel to the following two straight lines: a straight line connecting the light spot as the reference and the light spot that is the closest of the other light spots; and a straight line orthogonal to the straight line. On a straight line substantially parallel to these two straight lines, light spots 34 of the stray light are generated.

When with one light spot as the reference, the number of light spots that are the closest of the other light spots is two, if a straight line connecting the light spot as the reference and one of the two light spots is substantially parallel to the X'-axis direction, a straight line connecting the light spot as the reference and the other of the two light spots is substantially parallel to the Y'-axis direction. The X'-axis direction and the Y'-axis direction are orthogonal to each other. Further, at the point of intersection of two lines as diagonal lines of the light spot in the four corners of the diffracted light radiation region 36, a light spot 35 of the zero-order light is generated. At the second diffractive element 30, more than one light spot 33 by the diffracted light is generated in a direction substantially parallel to the X'-axis direction or the Y'-axis direction. Likewise, more than one light spot 34 by the stray light is generated in a direction substantially parallel to the X'-axis direction or the Y'-axis direction. The number of light spots in FIGS. 4A and 4B are merely an example, and the number is not limited thereto.

In the present embodiment, the diffracted light and the stray light are determined based on the light intensity at the light spots. "Light intensity" sometimes represents "light quantity" as the same meaning. That is, since intrinsically, stray light is ideally light that is not generated, it is considered that the intensity of the stray light is low compared with that of the diffracted light, and therefore, these are distinguished by the light intensity. Specifically, the intensity of the diffracted light whose intensity is the highest except the zero-order light is used as the reference and the light spots of a light intensity ¼ or less of the reference intensity can all be determined as stray light. This method is effective when the number of generated light spots by the diffracted light is not more than 100. The zero-order light is excepted based on the following reason: Generally, in diffractive elements, there are actually cases where unintended zero-order light of high intensity is generated because of a manufacturing error, a shift of the wavelength of the incident light from the design wavelength of the diffractive element, or the like. In some cases, the quantity of such zero-order light reaches several percent of the quantity of the incident light to become a quantity that is unignorable compared with the quantity of the design diffracted light. Since such unintended high-intensity zero-order light is unsuitable as the reference, it is excepted here. When the light spots can be divided into two groups of apparently different light intensities when the projected pattern is viewed, division between the design diffracted light and the stray light may be made based on the light intensities.

In addition thereto, as a method of distinguishing between diffracted light and stray light, the following may be performed: A light intensity histogram is created, a normal distribution is supposed, the light spots the intensities of which are higher than the difference when a standard deviation $2\sigma$ is subtracted from the average value of the light intensities are determined as light spots of the diffracted light, and the light spots the intensities of which are lower are determined as light spots of the stray light. In this case, when the histogram is created, if all the light spots that can be seen although slight are measured, the average value of the light quantities of the light spots becomes low. When a clear peak appears on the light quantity histogram, it is necessary to create the histogram so as not to include light of extremely low intensity when the average value and the standard deviation are calculated. This method is effective when the number of generated light spots by the diffracted light is not less than 100 and the light quantity distribution at each light spot is large. Moreover, in this case, similarly, when the light spots can be divided into two groups of apparently different light intensities when the projected pattern is viewed, division between the design diffracted light and the stray light may be made based on the light intensities.

Figure 5B:
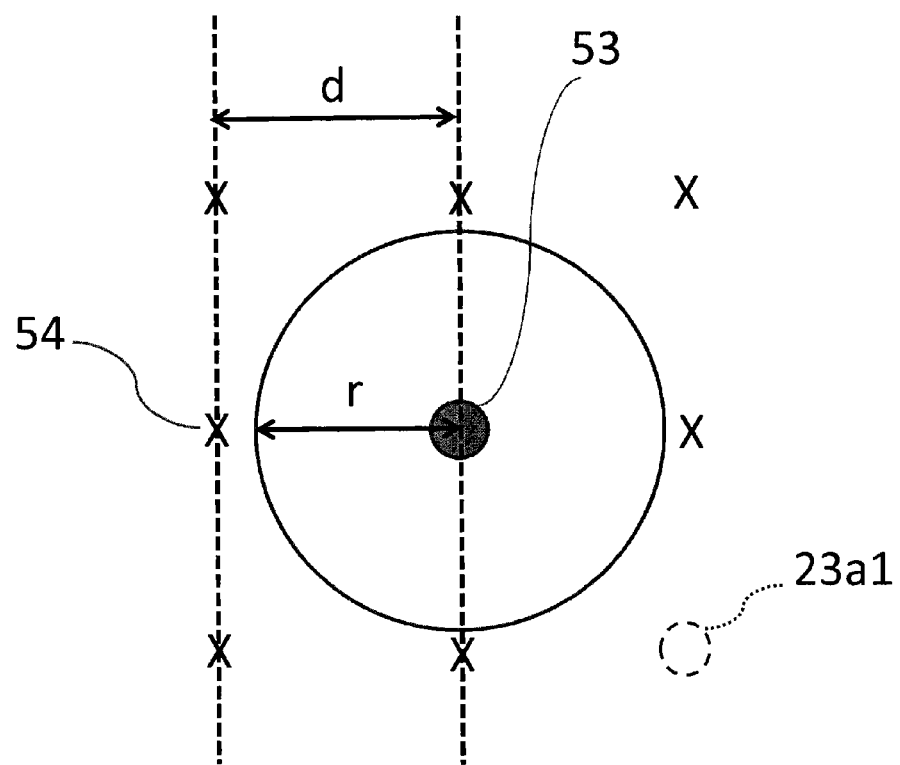
Figure 5C:
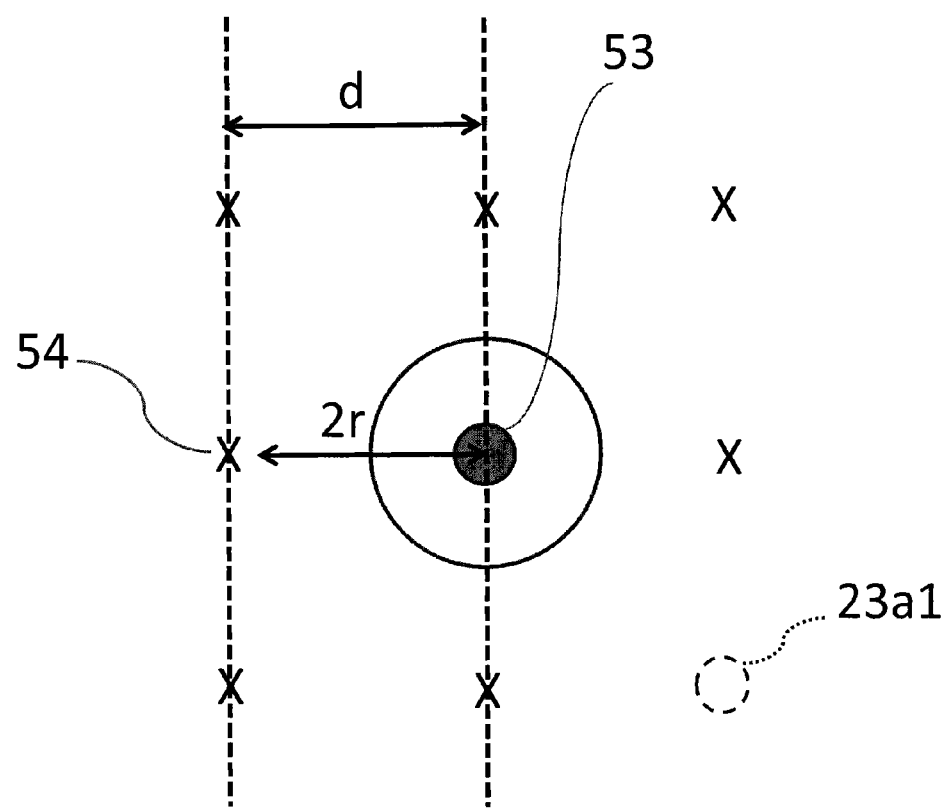

FIG. 5 is a view schematically showing the distribution of the light spots of the diffracted light and the like projected onto the projection surface 50 as the screen when the light 41 emitted from the light source 40 as shown in FIG. 1 is made incident on the diffractive optical element 10 according to the present embodiment to thereby generate the diffracted light and the like. Light spots 23a1, 23b1, 23c1 and 23d1 are light spots by the light not diffracted by the second diffractive element 30, that is, the light diffracted by the first diffractive element 20 and rectilinearly transmitted by the second diffractive element 30, and correspond to the light spot 35 of the zero-order light in FIG. 4B.

First, the diffracted light diffracted by the first diffractive element 20 is, then, further diffracted by the second diffractive element 30 to generate light spots 53 by the diffracted light. The light spots 53 by the diffracted light diffracted by the second diffractive element 30 are generated within diffracted light radiation regions 56a, 56b, 56c and 56d formed with the light spots 23a1, 23b1, 23c1 and 23d1 as the center. That is, these diffracted light radiation regions are regions formed by surrounding, so that the area is smallest, all the light spots 53 of the diffracted light obtained by further diffracting one diffracted light generated by the first diffractive element 20. At the points of intersection of two lines as diagonal lines of the light spots 53 in the four corners of the diffracted light radiation regions, the light spots 23a1, 23b1, 23c1 and 23d1 are generated, respectively. Although stray light is similarly generated by the first diffractive element 20 and the second diffractive element 30, for convenience of explanation of the present embodiment, FIG. 5 shows part of the stray lights generated with the light spot 23$a$1 as the center which stray light is generated by the second diffractive element 30.

When the light spot 53 by the diffracted light and the light spot 54 by the stray light coincide with each other, the light quantity of the light spot 53 by the diffracted light is largely changed by the influence of the interference. For example, when the quantity of the diffracted light is $I_1$, the phase thereof is $\phi_1$, the quantity of the stray light is $I_2$ and the phase thereof is $\phi_2$, because of the influence of the interference, the light quantity is $2\times(I_1\times I_2)^{0.5}\times\cos(\phi_1-\phi_2)$. Therefore, even when the ratio between the quantity of the diffracted light and the quantity of the stray light, that is, $I_1:I_2$ is 100:1, the influence of the light interference cannot be ignored.

Now, with respect to a case where the design diffracted light and the stray light have a uniform phase distribution and the design diffracted light and the stray light coincide with each other, the case of a phase difference $\pi$ where the influence of the interference therebetween is largest will be particularly considered. The influence of the interference referred to here corresponds, specifically, to fluctuations in the quantity of the design diffracted light generated by the interference. At this time, for example, when the ratio between the quantity of the design diffracted light and the quantity of the stray light is $I_1:I_2=1:0.1$, the value of the influence of the interference is approximately −0.6 at the maximum, and the quantity of the design diffracted light is changed to half or less like 1−0.6=0.4 when it is lowest. For example, if it is tried to keep the quantity of the design diffracted light half or more compared with a case where there is no interference in order to clarify the distinction between the design diffracted light and the stray light with the light quantity as the index, it is necessary to eliminate the influence of the interference for the stray light where $I_1:I_2=1:0.063$ or more based on the above expression.

In other words, in this case, even if light of a weak light quantity $I_2$ where $I_1:I_2=1$:less than 0.063 coincides with the design diffracted light, design diffracted light of half or more of the quantity when there is no interference is obtained. For this reason, if light of such a weak light quantity is all determined as stray light, since there are cases where no solution is obtained to a design for arranging the first diffractive element 20 and the second diffractive element 30 in such a way that the light spots of the design diffracted light and the light spots of the stray light do not coincide with each other, a lower limit may be provided to the quantity of the stray light. Therefore, in this case, it is preferable that light having a quantity of 1/16 or more of the lower limit of the quantity of the design diffracted light when there is no interference be considered as stray light and light of a quantity less than that be not considered. Although depending on the degree of interference, it can be performed that light of the quantity $I_2$ where $I_1:I_2=1$:less than 0.25 is not considered as stray light. This is because in this case, when the above expression is based upon, since the value of the influence of the interference is higher than −1, the quantity of the design diffracted light is a value higher than 0 even if there is interference.

Therefore, it is necessary only that the stray light has a quantity of ¼ or more of the lower limit of the quantity of the design diffracted light when there is no interference. Although it is more preferable that the quantity be 1/16 or more of the lower limit of the quantity of the design diffracted light when there is no interference, since the actual phase distribution of the diffracted light is not always uniform, the range of the intensity of the stray light to be eliminated depends on the optical system, and the range may be determined in each case. Further, since there is also an influence of the interference when the light quantity of the light spot by the stray light is 1/100 the quantity of the design diffracted light, it can also be considered that the quantity of the stray light is 1/100 or more of the quantity of the design diffracted light. It is assumed that the design diffracted light is light of a quantity of more than ¼ when the intensity of the diffracted light whose intensity is the highest is the reference. Since the light quantity is reduced by the diffracted light and the stray light coinciding with each other to generate interference as described above, it is preferable that the light spot 53 of the diffracted light and the light spot 54 of the stray light coincide with each other as little as possible.

Next, the coincidence of the stray light and the diffracted light will be considered. Here, specifically, when the radius of the light spots 53 and 54 is r and the distance from the center of the light spot 53 of the diffracted light to the center of the light spot 54 of the stray light is d, it is preferable that d>r so that the center of the light spot 54 of the stray light is not present in the light spot 53 of the diffracted light, and it is more preferable that d>2r so that the light spot 53 of the diffracted light and the light spot 54 of the stray light do not coincide with each other. The position of the light spot 53 of the diffracted light and the position of the light spot 54 of the stray light can be calculated by ray trace so that such a condition is satisfied, and as shown in FIG. 2B, the angle $\phi$ which is the angle between the direction in which the basic units 22 are arranged in the first diffractive element 20 and the direction in which the basic units 32 are arranged in the second diffractive element 30 can be calculated.

Figure 6A:
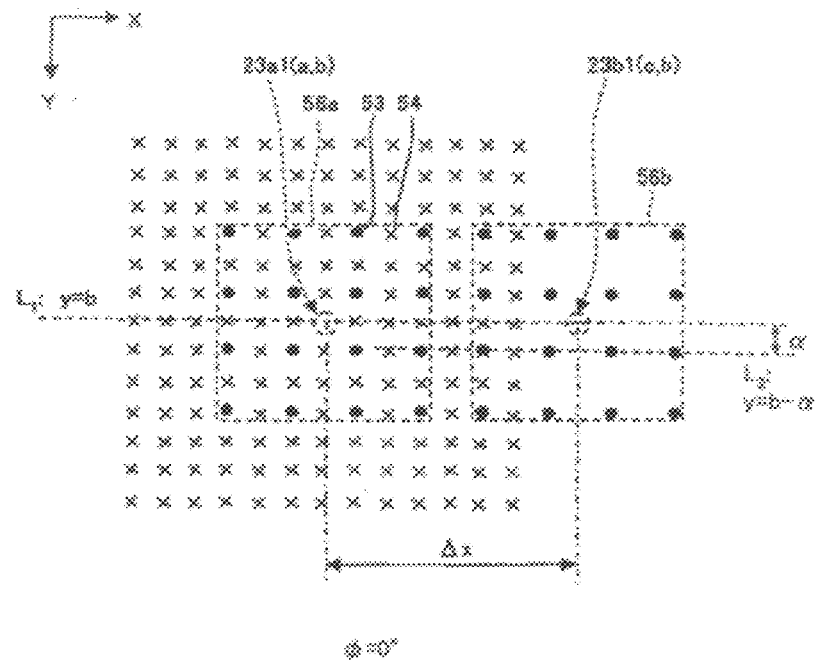
FIGS. 6A and 6B are explanatory views (2) of the diffractive optical element according to the present embodiment.
Figure 6B:
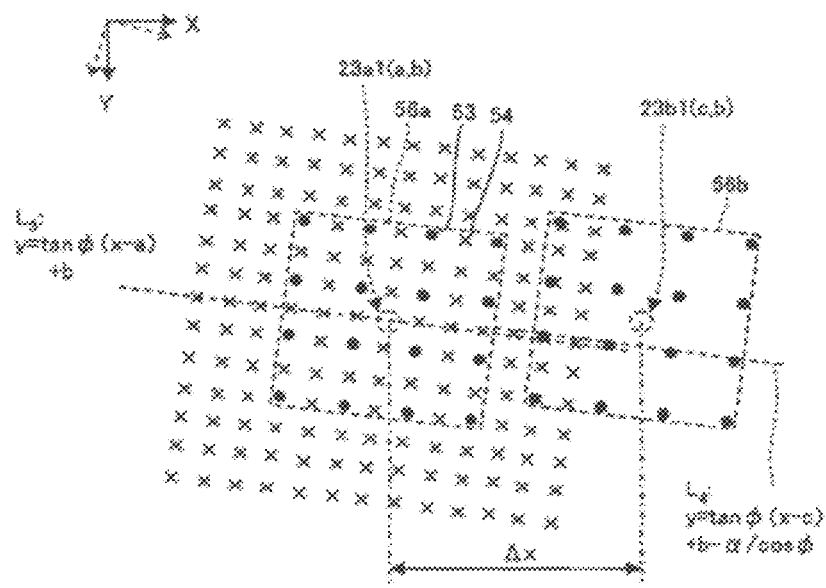

FIG. 6A is a schematic view showing the arrangement of the light spots on the projection surface 50 when the angle $\phi=0$, and FIG. 6B is a schematic view showing the arrangement of the light spots on the projection surface 50 when the angle $\phi=\phi_1$. For convenience of explanation, FIGS. 6A and 6B show the diffracted light radiation regions 56$a$ and 56$b$ formed with the light spots 23$a$1 and 23$b$1 as the center and part of the stray light generated with the light spot 23$a$1 as the center. In the light spot distribution shown in FIG. 6A, there is a part where the light spot 53 of the diffracted light and the light spot 54 of the stray light coincide with each other, and in this case, the light quantity of the light spots by the diffracted light in this part is not stable as described above. When the angle $\phi=\phi_1$, in the light spot distribution shown in FIG. 6B, there is a part where the light spot 53 of the diffracted light and the light spot 54 of the stray light coincide with each other, and in this case, the light quantity of the light spots of the diffracted light in this part is not stable, either.

Here, it is assumed that in the diffracted light radiation region 56$a$ shown in FIG. 6A, the distance between the center of the light spot 53 of a diffracted light and the center of the light spot 54 of a stray light existing in a position the closest to the light spot 53 of the diffracted light is a closest distance $\alpha$. When based on the (x, y) coordinates shown in FIG. 6A, the positional coordinates of the center of the light spot 23$a$1 are (a, b) and the positional coordinates of the center of the light spot 23$b$1 are (c, b), in FIG. 6A, a straight line $L_1$ including 23$a$1 and along which the light spots of the stray light line up can be expressed as a function of y=b. On the other hand, a straight line $L_2$ parallel to the straight line $L_1$ and situated at a distance a therefrom can be expressed as a function of y=b−α.

When the angle $\phi=\phi_1$, in FIG. 6B, a straight line $L_3$ including 23$a$1 and along which the light spots of the stray light line up can be expressed as a function of y=tan $\phi_1$(x−a)+b. On the other hand, a straight line $L_4$ situated at the distance $\alpha$ can be expressed as y=tan $\phi_1$(x−c)+b−α/cos $\phi_1$. Moreover, when an interval Δx=(c−a) where the distance between the light spot 23a1 and the light spot 23b1 in the X-axis direction is the closest distance Δx, in the case shown in FIG. 6B, the condition for the straight line $L_3$ and the straight line $L_4$ coinciding with each other is shown as Expression 3 and the preferred range that the angle ϕ can take is expressed by Expression 4.

$$\sin \phi_1 = -\alpha/\Delta x \quad \text{[Expression 3]}$$

$$-|\phi_1| < \phi < |\phi_1|, \text{ and } \phi \ne 0 \quad \text{[Expression 4]}$$

While a case where the Y coordinates are the same and the X coordinates are different at the light spots 23a1 and 23b1 of two diffracted lights has been described above, the preferred range of the angle ϕ can be calculated in a similar manner when the X coordinates are the same and the Y coordinates are different at the light spots of two diffracted lights. Further, while a case where the first diffractive element 20, the second diffractive element 30 and the like are relatively inclined at the angle ϕ has been described, the basic units of each diffractive element may be periodically arranged in two axial directions that are not orthogonal to each other, or it is possible to arrange the light spots by diffracted light and the light spots by stray light so as not to coincide with each other by adjusting the lengths of the pitches Px and Py in the basic units. While a case where two diffractive optical elements, the first diffractive element 20 and the second diffractive element 30, are used has been described above, a similar consideration applies when three or more diffractive optical elements are used.

(Measurement Device)

Figure 7:
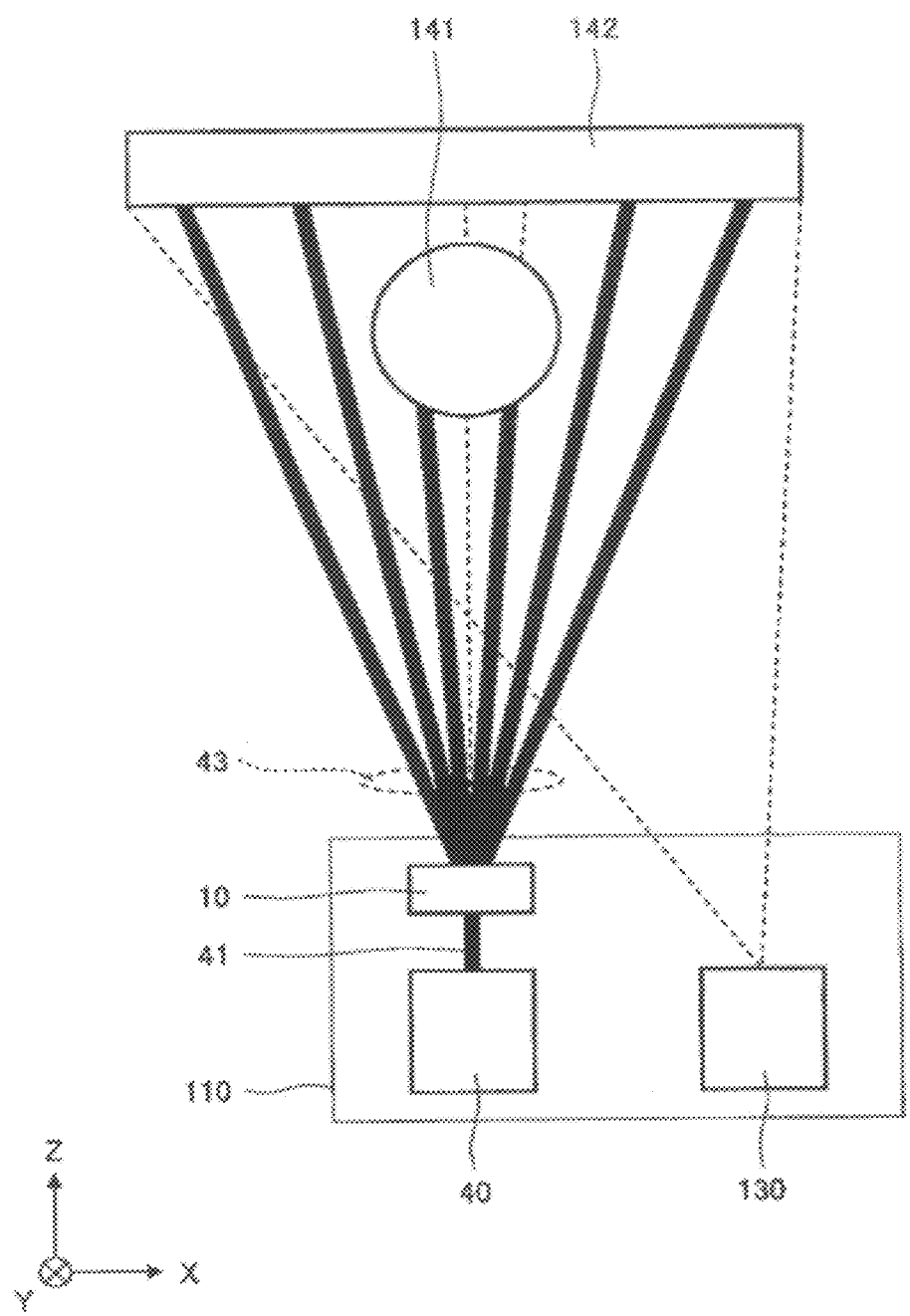
FIG. 7 is a structural view of a measurement device according to the present embodiment.

Next, a measurement device according to the present embodiment will be described. FIG. 7 is a schematic view showing the measurement device 110 according to the present embodiment. The measurement device 110 according to the present embodiment has the light source 40, the above-described diffractive optical element 10 according to the present embodiment, an imaging element 130 and a non-illustrated image processor that processes images taken by the imaging element 130.

The diffractive optical element 10 generates, for example, diffracted lights 43 (43a, 43b, 43c, 43d) by making incident the light (incident light) 41 emitted from the light source 40. The imaging element 130 takes images of objects to be measured 141 and 142 to which a projection pattern of the light spots generated by the diffracted lights 43 is radiated.

As described above, a plurality of diffracted lights 43 are generated by the diffractive optical element 10, and a desired projection pattern is formed by the light spots generated by these diffracted lights 43. This projection pattern is radiated to the objects to be measured 141 and 142, and when the positions and shapes of the objects to be measured 141 and 142 are changed, since the distance between the light spots and the like are changed, by taking images thereof by the imaging element 130, information such as the three-dimensional shapes and the like of the objects to be measured 141 and 142 can be obtained.

EXAMPLES

Example 1

Figure 8A:
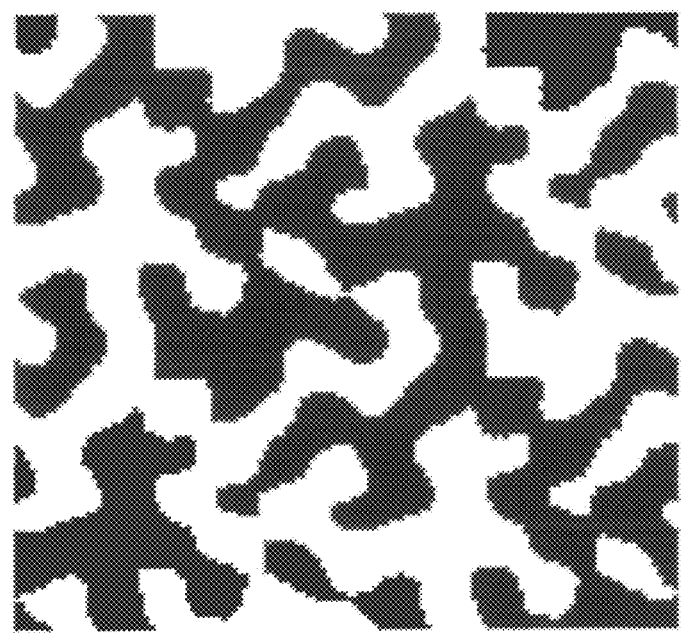
FIGS. 8A and 8B are explanatory views (1) of the first diffractive element and the second diffractive element according to Example 1.

As the first diffractive element 20, a diffractive optical element generating 8×8-point diffracted light was produced. Specifically, by Expression 1, the phase distribution was calculated by repetitive Fourier transformation so that the diffraction order distribution was such that the pitch $P1_x = P1_y = 64$ μm and the orders $(n1_x, n1_y) = (2n-1, 2m-1)$ (n=−3, −2, −1, 0, 1, 2, 3, 4, m=−3, −2, −1, 0, 1, 2, 3, 4). An image of the calculated phase distribution at the basic units 22 is shown in FIG. 8A. In FIG. 8A, in the black parts, the phase is zero, and in the white parts, the phase is −π. That is, when the incident light is in-phase light with a wavelength λ, the exit light from the white parts is given a phase difference of −π with respect to the exit light from the black parts.

Figure 9A:
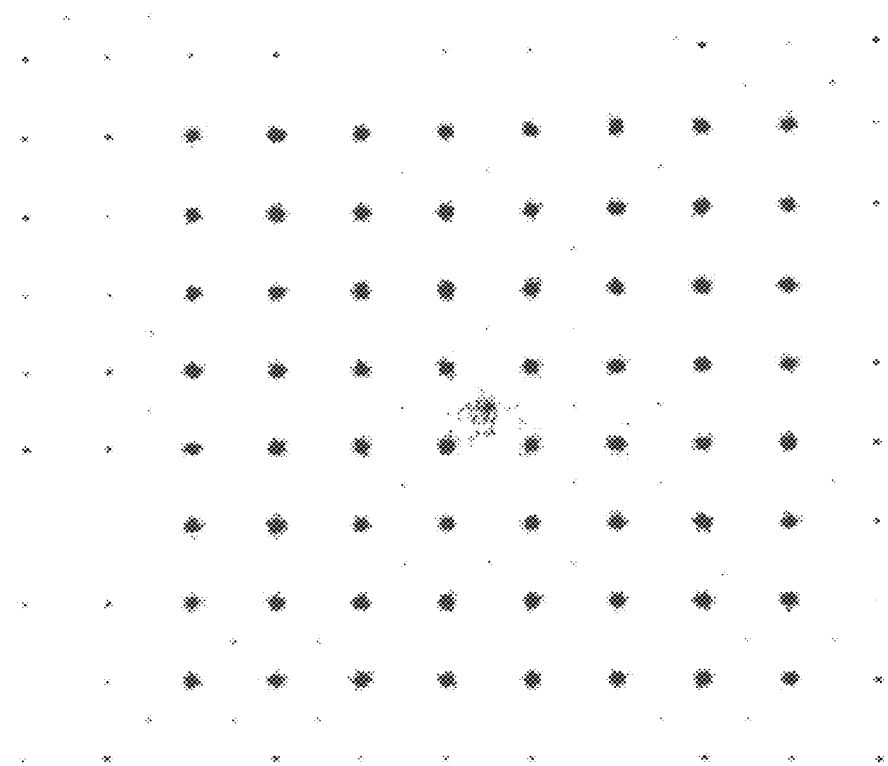
FIGS. 9A and 9B are explanatory views (2) of the first diffractive element and the second diffractive element according to Example 1.
Figure 9B:
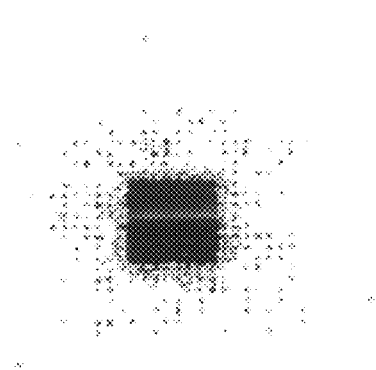

A resist pattern was formed by applying a photoresist to a quartz substrate and performing exposure and development by an exposure device so that the phase distribution was the calculated one as described above, and etching was performed with the formed resist pattern as the mask, whereby a two-step convex and concave pattern was formed so that the height of one step was 720 nm. When light with a wavelength of 660 nm was made incident on the thus formed first diffractive element 20 from a direction orthogonal to the surface of the first diffractive element 20, as shown in FIG. 9A, light spots of diffracted light with a diameter of approximately 0.5 mm were obtained. In FIGS. 9A and 9B, the light spots are shown in black.

Figure 8B:
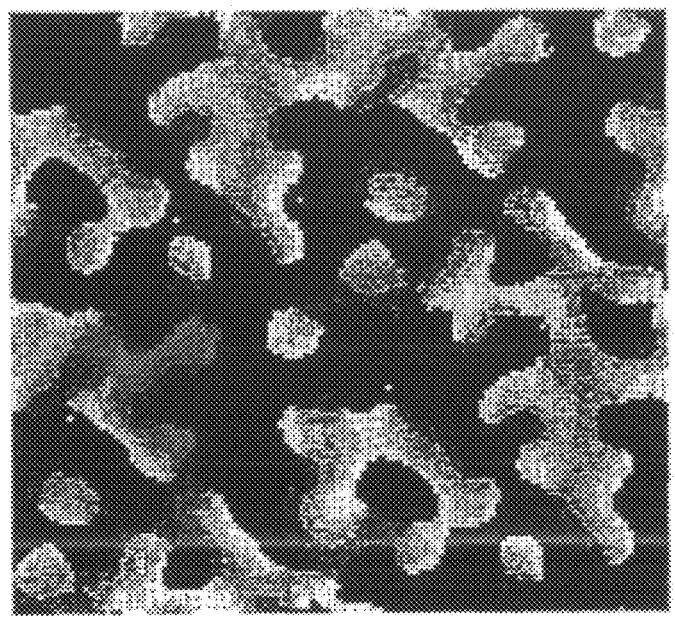

Then, as the second diffractive element 30, a diffractive optical element generating 8×8-point diffracted light was produced. Specifically, by Expression 2, the phase distribution was calculated by repetitive Fourier transformation so that the diffraction order distribution was such that the pitch $P2_x = P2_y = 512$ μm and the orders $(n2_x, n2_y) = (2n-1, 2m-1)$ (n=−3, −2, −1, 0, 1, 2, 3, 4, m=−3, −2, −1, 0, 1, 2, 3, 4). An image of the calculated phase distribution at the basic units 32 is shown in FIG. 8B. In FIG. 8B, in the black parts, the phase is zero, in the white parts, the phase is −7π/4, and a phase distribution of eight levels of gray is shown so that the density of gray changes every π/4. By repeating the formation of a resist pattern by applying a photoresist to a quartz substrate and performing exposure and development by an exposure device so that the phase distribution was the calculated one as described above, and the etching with the formed resist pattern as the mask, an eight-step convex and concave pattern was formed so that the height of one step was 183 nm. When light with a wavelength of 660 nm was made incident on the thus formed second diffractive element 30 from a direction orthogonal to the surface of the second diffractive element 30, light spots of diffracted light as shown in FIG. 9B were obtained.

Figure 10A:
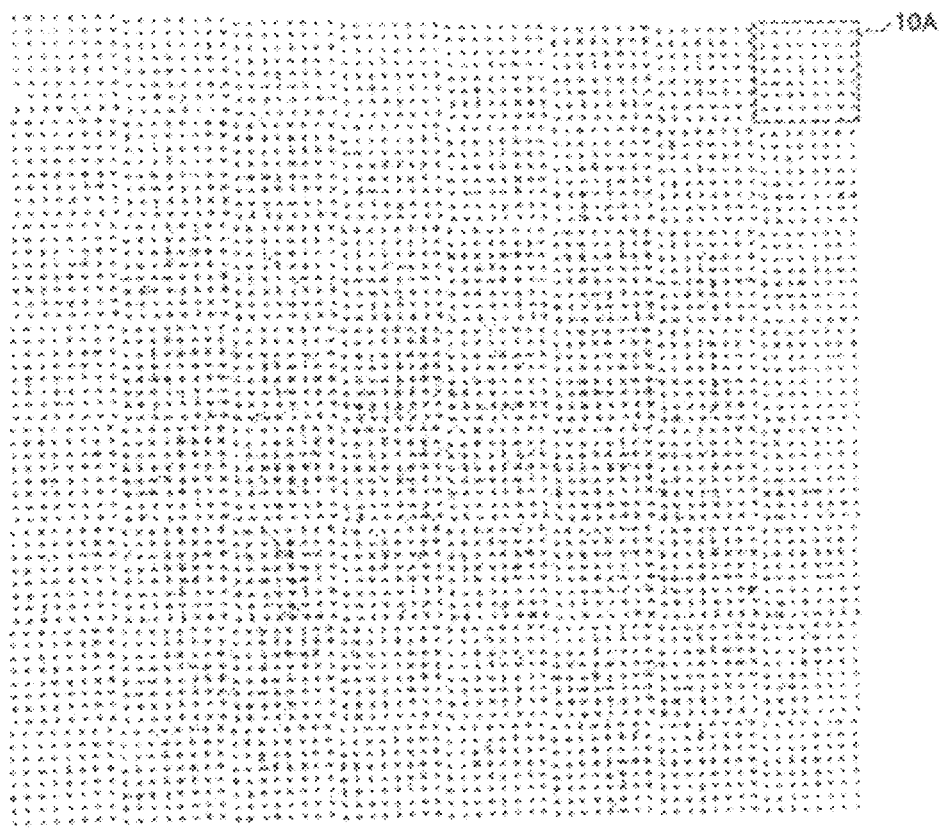
FIGS. 10A and 10B are views of light spots generated by the diffractive optical element according to Example 1.
Figure 10B:
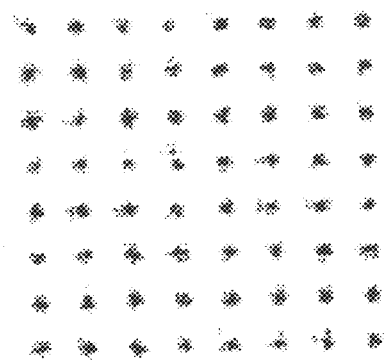

Then, the first diffractive element 20 and the second diffractive element 30 were pasted together so that the surfaces where the convex and concave patterns were formed were in contact with air under a condition where the angle ϕ=1°, thereby producing the diffractive optical element 10 according to the present example. Light with a wavelength of 660 nm was made incident on the diffractive optical element 10 according to the present example, and light spots were projected onto the projection surface 50 placed 1.5 m away. FIG. 10A shows light spots thus projected onto the projection surface 50. In FIGS. 10A and 10B, the light spots are shown in black. FIG. 10B is an enlarged view of the region surrounded by the broken line 10A in FIG. 10A. As shown in FIGS. 10A and 10B, with the diffractive optical element 10 according to the present example, light spots of a substantially uniform and stable light quantity distribution without any influence of the interference can be obtained. At this time, the values of the red bit components corresponding to the R elements of the RGB elements of the pixels constituting a bitmapped image were added up for each light spot, and in the case of the image shown in FIG. 10B, the standard deviation was 0.13 when the average value of the light quantity was 1.

Here, in the first diffractive element 20, the diffraction angle of the diffracted light where the orders $(n1_x, n1_y)$ Z=(1, 1) is 0.59° from Expression 1. Therefore, the interval $\Delta x$ in the X-axis direction of the design diffracted light of $(n1_x, n1_y)$= (1, 1), (−1, 1) on the projection surface is 30.9 mm. Moreover, in the second diffractive element 30, the angular interval in the Y-axis direction of the diffracted light is, when compared with a case where $n2_y$ is 0 and 1, 0.07° from Expression 2. Therefore, the minimum interval of the diffracted light or the stray light on the projection surface is 1.9 mm. When $\phi_1$ is calculated by Expression 4 from the above values, $\phi_1$ is 3.6°.

Example 2

Figure 11A:
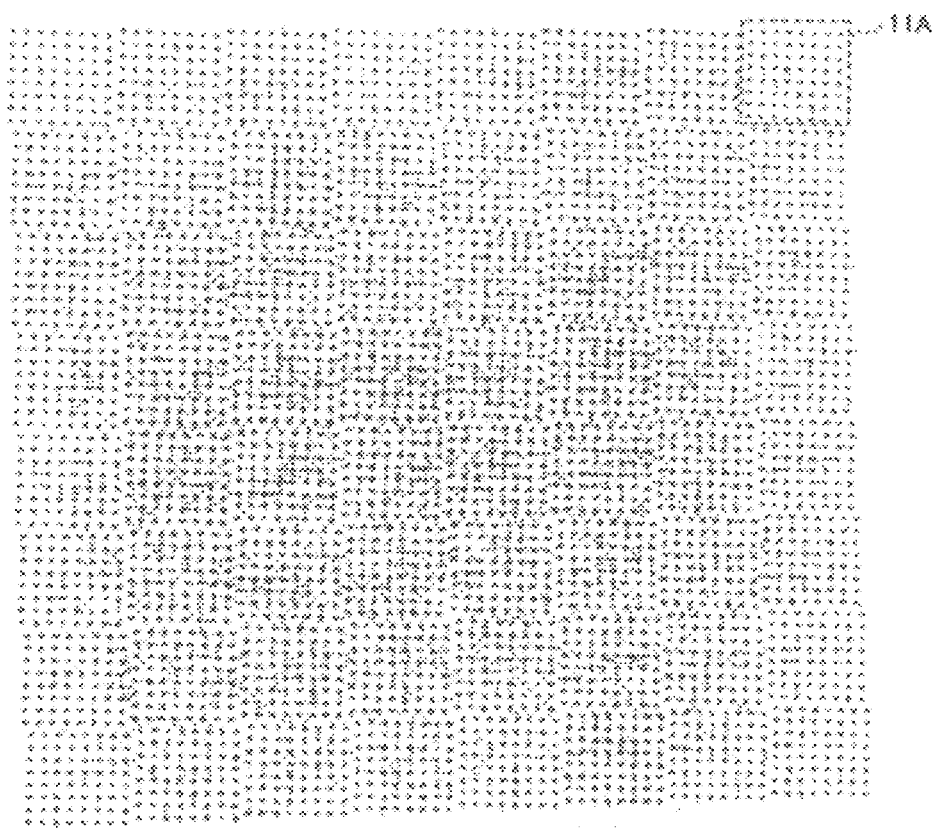
FIGS. 11A and 11B are views of light spots generated by the diffractive optical element according to Example 2.
Figure 11B:
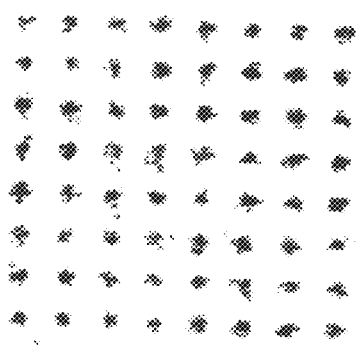

Next, Example 2 will be described. The first diffractive element 20 and the second diffractive element 30 according to Example 1 were pasted together so that the surfaces where the convex and concave patterns were formed were in contact with air under a condition where the angle $\phi$=−2.5°, thereby producing the diffractive optical element 10 according to the present example. Light with a wavelength of 660 nm was made incident on the diffractive optical element 10 according to the present example from a direction orthogonal to the surface of the diffractive optical element 10, and light spots were projected onto the projection surface 50 placed 1.5 m away. FIG. 11A shows light spots thus projected onto the projection surface 50. In FIGS. 11A and 11B, the light spots are shown in black. FIG. 11B is an enlarged view of the region surrounded by the broken line 11A in FIG. 11A. As shown in FIGS. 11A and 11B, with the diffractive optical element according to the present example, light spots of a substantially uniform and stable light quantity distribution without any influence of the interference can be obtained. The values of the red bit components corresponding to the R elements at this time were added up for each light spot, and in the case of the image shown in FIG. 11B, the standard deviation was 0.18 when the average value of the light quantity was 1.

Example 3

Next, Example 3 will be described. The present example is different from the structure where the first diffractive element 20 and the second diffractive element 30 are each placed in a condition of being inclined with respect to the direction of the periodicity thereof as in Examples 1 and 2. That is, by adjusting the pitch of the periodicity of the basic units 22 of the first diffractive element 20 and the pitch of the periodicity of the basic units 32 of the second diffractive element 30, the light spots by diffracted light and the light spots by stray light are prevented from coinciding with each other.

The first diffractive element 20 is produced so that the diffraction order distribution is such that the pitch $P1_x$ of the first diffractive element $20=P1_y=64$ μm and the orders $(n1_x, n1_y)=(2n-1, 2m-1)$ (n=−1, 0, 1, 2, m=−1, 0, 1, 2). The second diffractive element 30 is produced so that the diffraction order distribution is such that the pitch $P2_x$ of the second diffractive element $30=P2_y=495$ μm and the orders $(n2_x, n2_y)=(2n-1, 2m-1)$ (n=−3, −2, −1, 0, 1, 2, 3, 4, m=−3, −2, −1, 0, 1, 2, 3, 4). The first diffractive element 20 and the second diffractive element 30 were pasted together so that the surfaces where the convex and concave patterns were formed were in contact with air under a condition where the angle $\phi$=0°, thereby producing the diffractive optical element 10 according to the present example.

Figure 12:
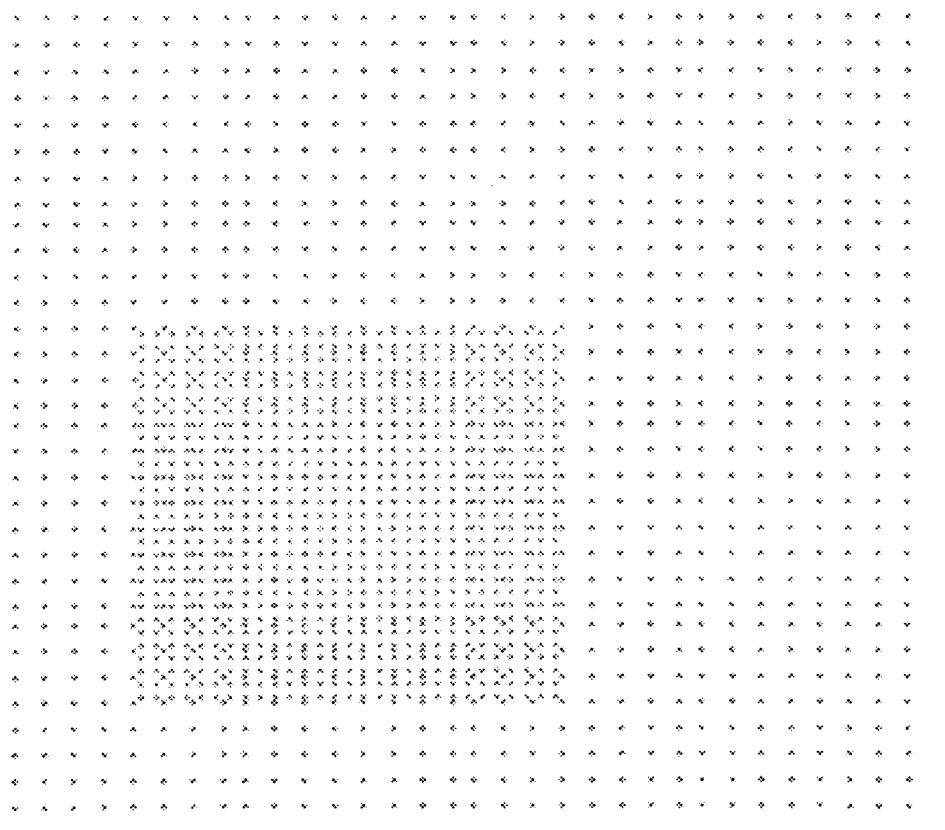
FIG. 12 is an explanatory view of light spots generated by the diffractive optical element according to Example 3.

Light with a wavelength of 660 nm was made incident on the diffractive optical element 10 according to the present example from a direction orthogonal to the surface of the diffractive optical element 10, and light spots projected onto the projection surface placed 1.5 m away were calculated by a calculation. In FIG. 12, "•" as diffracted light shows the positions of the light spots of the diffracted light generated by the diffracted light generated by the first diffractive element 20 being incident and diffracted by the second diffractive element 30. "×" as stray light shows the positions of the light spots of the stray light generated by the diffracted light of diffraction orders (−1, −1) generated by the first diffractive element 20 being incident and diffracted by the second diffractive element 30. As shown in FIG. 12, even if the angle $\phi$ is 0°, by adjusting the pitches of the basic units 22 and the basic units 32 of the first diffractive element 20 and the second diffractive element 30, the coincidence of diffracted light and stray light can be reduced, and the influence of the interference between diffracted light and stray light can be reduced.

Comparative Example 1

Figure 13A:
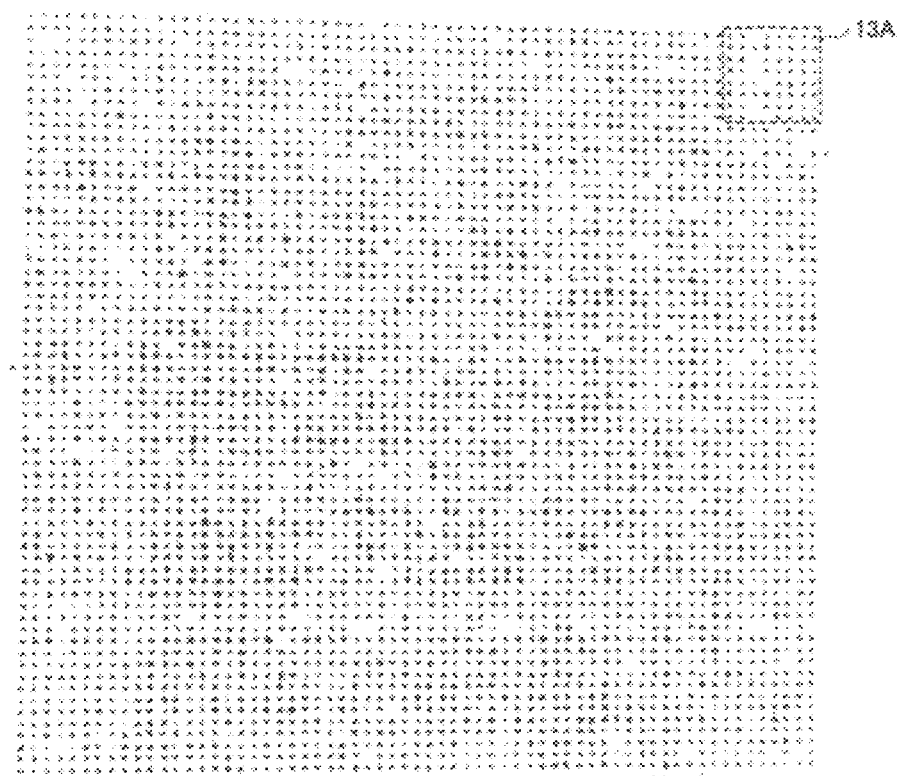
FIGS. 13A and 13B are views of light spots generated by the diffractive optical element according to Comparative Example 1.
Figure 13B:
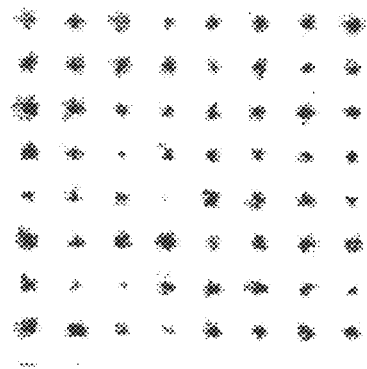

Next, Comparative Example 1 will be described. The first diffractive element 20 and the second diffractive element 30 according to Example 1 were pasted together so that the surfaces where the convex and concave patterns were formed were in contact with air under a condition where the angle $\phi$=0°, thereby producing the diffractive optical element 10 according to Comparative Example 1. Light with a wavelength of 660 nm was made incident on the diffractive optical element 10 according to Comparative Example 1 from a direction orthogonal to the surface of the diffractive optical element 10, and light spots were projected onto the projection surface placed 1.5 m away. FIG. 13A shows light spots thus projected onto the projection surface. In FIGS. 13A and 13B, the light spots are shown in black. FIG. 13B is an enlarged view of the region surrounded by the broken line 13A in FIG. 13A. As shown in FIGS. 13A and 13B, in the diffractive optical element according to Comparative Example 1, the level difference among the light intensities of the light spots is large because of the influence of the interference, the light intensity is not uniform, and light spots of an extremely unstable light quantity distribution are generated because of the influence of the interference. The values of the red bit components corresponding to the R elements at this time were added up for each light spot, and in the case of the image shown in FIG. 13B, the standard deviation was 0.29 when the average value of the light quantity was 1, which was a high value compared with those in the examples.

While a mode related to the practice of the present invention has been described, the above contents do not limit the contents of the invention.

What is claimed is:

1. A diffractive optical element for generating two-dimensional diffracted light, comprising:
   a first diffractive element positioned to receive incident light and comprising a plurality of basic units two-dimensionally arranged in a first direction; and
   a second diffractive element positioned to receive diffracted light generated by the first diffractive element and comprising a plurality of basic units two-dimensionally arranged in a second direction,
   wherein the first direction and the second direction form an angle $\phi$ between the first direction and the second direction such that $-|\phi_1|<\phi<|\phi_1|$, $\phi\neq 0$, and $\sin\phi_1=-\alpha/\Delta x$ are satisfied, where $\alpha x$ represents a distance between closest spots of zero-order light generated when the diffracted light generated by the first diffractive element is further incident on the second diffractive element, $\alpha$ represents a distance between a light spot of two-dimensional diffracted light relative to a closest light spot of stray light generated by the second diffractive element, and the stray light has a light intensity of ¼ or less with respect to a highest intensity of the two-dimensional diffracted light except the zero-order light.

2. The diffractive optical element according to claim 1, wherein a pitch of the basic units formed in the first diffractive element and a pitch of the basic units formed in the second diffractive element are different values on two-dimensional coordinates.

3. The diffractive optical element according to claim 1, wherein the first diffractive element comprises a first transparent substrate having the basic units of the first diffractive element formed on a surface of the first transparent substrate, and the second diffractive element comprises a second transparent substrate having the basic units of the second diffractive element formed on a surface of the second transparent substrate.

4. The diffractive optical element according to claim 1, wherein the first diffractive element comprises a transparent substrate having the basic units of the first diffractive element formed on a first surface, and the second diffractive element comprises the transparent substrate having the basic units of the second diffractive element formed on a second surface on an opposite side with respect to the first surface.

5. The diffractive optical element according to claim 1, wherein the first diffractive element and the second diffractive element are configured to generate the two-dimensional diffracted light which forms 100 light spots or less.

6. A diffractive optical element for generating two-dimensional diffracted light, comprising:
a first diffractive element positioned to receive incident light and comprising a plurality of basic units two-dimensionally arranged; and
a second diffractive element positioned to receive diffracted light generated by the first diffractive element and comprising a plurality of basic units two-dimensionally arranged,
wherein the first and second diffractive elements are configured such that the second diffractive element generates two-dimensional diffracted light from the incident light received on the first diffractive element, and the first diffractive element and the second diffractive element satisfy d>r such that a center of a light spot of stray light is not present in a light spot of the two-dimensional diffracted light, where d represents a distance between a center of the light spot of the two-dimensional diffracted light and the center of the light spot of the stray light generated by the first diffractive element and the second diffractive element, r represents a radius of the light spots, and the stray light has a light intensity in a range of ¼ or less to ¹⁄₁₀₀ or more with respect to a highest intensity of the two-dimensional diffracted light except a zero-order light.

7. The diffractive optical element according to claim 6, wherein a pitch of the basic units formed in the first diffractive element and a pitch of the basic units formed in the second diffractive element are different values on two-dimensional coordinates.

8. The diffractive optical element according to claim 6, wherein the first diffractive element and the second diffractive element satisfy d>2r such that the light spot of the stray light does not coincide with the light spot of the two-dimensional diffracted light.

9. The diffractive optical element according to claim 6, wherein the first diffractive element comprises a first transparent substrate having the basic units of the first diffractive element formed on a surface of the first transparent substrate, and the second diffractive element comprises a second transparent substrate having the basic units of the second diffractive element formed on a surface of the second transparent substrate.

10. The diffractive optical element according to claim 6, wherein the first diffractive element comprises a transparent substrate having the basic units of the first diffractive element formed on a first surface, and the second diffractive element comprises the transparent substrate having the basic units of the second diffractive element formed on a second surface on an opposite side with respect to the first surface.

11. The diffractive optical element according to claim 6, wherein the first diffractive element and the second diffractive element are configured to generate the two-dimensional diffracted light which forms 100 light spots or less.

12. The diffractive optical element according to claim 6, wherein the stray light has a light intensity in a range of ¼ or less to ¹⁄₁₆ or more with respect to the highest intensity of the two-dimensional diffracted light except the zero-order light.

13. A measurement device, comprising:
a light source configured to emit light;
a diffractive optical element configured to generate two-dimensional diffracted light and comprising a first diffractive element and a second diffractive element; and
an imaging element configured to take an image of an object which is radiated by the two-dimensional diffracted light and is to be measured,
wherein the first diffractive element is positioned to receive the light emitted by the light source and has a plurality of basic units two-dimensionally arranged in a first direction, the second diffractive element is positioned to receive diffracted light generated by the first diffractive element and has a plurality of basic units two-dimensionally arranged in a second direction, and the first direction and the second direction form an angle $\phi$ between the first direction and the second direction is such that $-|\phi_1|<\phi<|\phi_1|$, $\phi \neq 0$, and $\sin \phi_1 = -\alpha/\Delta x$ are satisfied, where $\Delta x$ represents a distance between closest spots of zero-order light generated when the diffracted light generated by the first diffractive element is further incident on the second diffractive element, $\alpha$ represents a distance between a light spot of two-dimensional diffracted light relative to a closest light spot of stray light generated by the second diffractive element, and the stray light has a light intensity of ¼ or less with respect to a highest intensity of the two-dimensional diffracted light except the zero-order light.

14. The measurement device according to claim 13, wherein a pitch of the basic units formed in the first diffractive element and a pitch of the basic units formed in the second diffractive element are different values on two-dimensional coordinates.

15. The measurement device according to claim 13, wherein the first diffractive element comprises a first transparent substrate having the basic units of the first diffractive element formed on a surface of the first transparent substrate, and the second diffractive element comprises a second transparent substrate having the basic units of the second diffractive element formed on a surface of the second transparent substrate.

16. The measurement device according to claim 13, wherein the first diffractive element comprises a transparent substrate having the basic units of the first diffractive element formed on a first surface, and the second diffractive element comprises the transparent substrate having the basic units of the second diffractive element formed on a second surface on an opposite side with respect to the first surface.

17. A measurement device, comprising:
a light source configured to emit light;
a diffractive optical element configured to generate two-dimensional diffracted light and comprising a first diffractive element and a second diffractive element; and
an imaging element configured to take an image of an object which is radiated by the two-dimensional diffracted light and is to be measured,
wherein the first diffractive element is positioned to receive incident light and has a plurality of basic units two-dimensionally arranged, the second diffractive element is positioned to receive diffracted light generated by the first diffractive element and has a plurality of basic units two-dimensionally arranged, the first and second diffractive elements are configured such that the second diffractive element generates two-dimensional diffracted light from the incident light received on the first diffractive element, and the first diffractive element and the second diffractive element satisfy d>r such that a center of a light spot of stray light is not present in a light spot of the two-dimensional diffracted light, where d represents a distance between a center of the light spot of the two-dimensional diffracted light and the center of the light spot of the stray light generated by the first diffractive element and the second diffractive element, r represents a radius of the light spots, and the stray light has a light intensity in a range of $1/4$ or less to $1/100$ or more with respect to a highest intensity of the two-dimensional diffracted light except a zero-order light.

18. The measurement device according to claim 17, wherein a pitch of the basic units formed in the first diffractive element and a pitch of the basic units formed in the second diffractive element are different values on two-dimensional coordinates.

19. The measurement device according to claim 17, wherein the first diffractive element comprises a first transparent substrate having the basic units of the first diffractive element formed on a surface of the first transparent substrate, and the second diffractive element comprises a second transparent substrate having the basic units of the second diffractive element formed on a surface of the second transparent substrate.

20. The measurement device according to claim 17, wherein the first diffractive element comprises a transparent substrate having the basic units of the first diffractive element formed on a first surface, and the second diffractive element comprises the transparent substrate having the basic units of the second diffractive element formed on a second surface on an opposite side with respect to the first surface.

* * * * *